(No Model.) 2 Sheets—Sheet 2.
A. W. BROWNE.
ADJUSTABLE BRACKET FOR DENTAL ENGINES.
No. 522,552. Patented July 3, 1894.
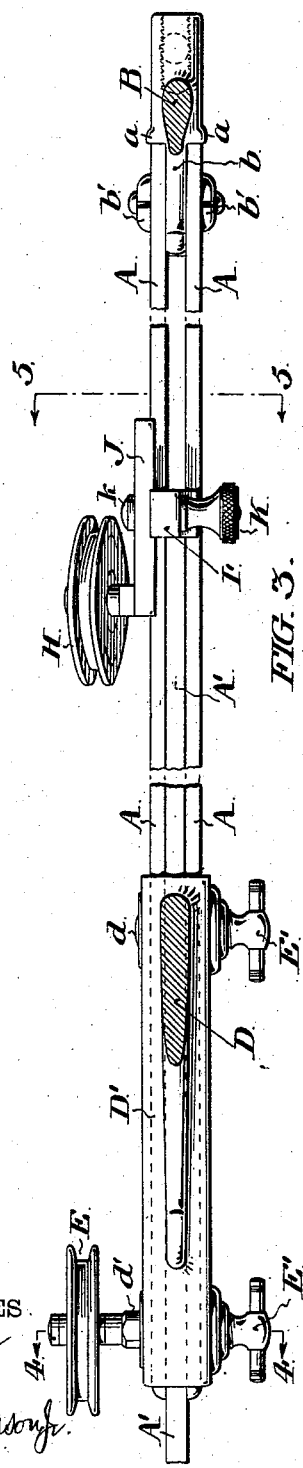
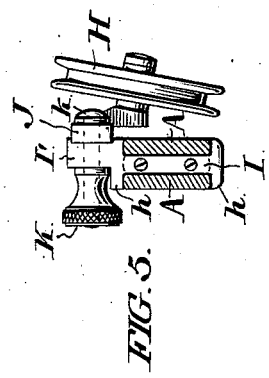
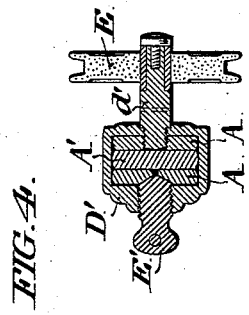
WITNESSES
INVENTOR

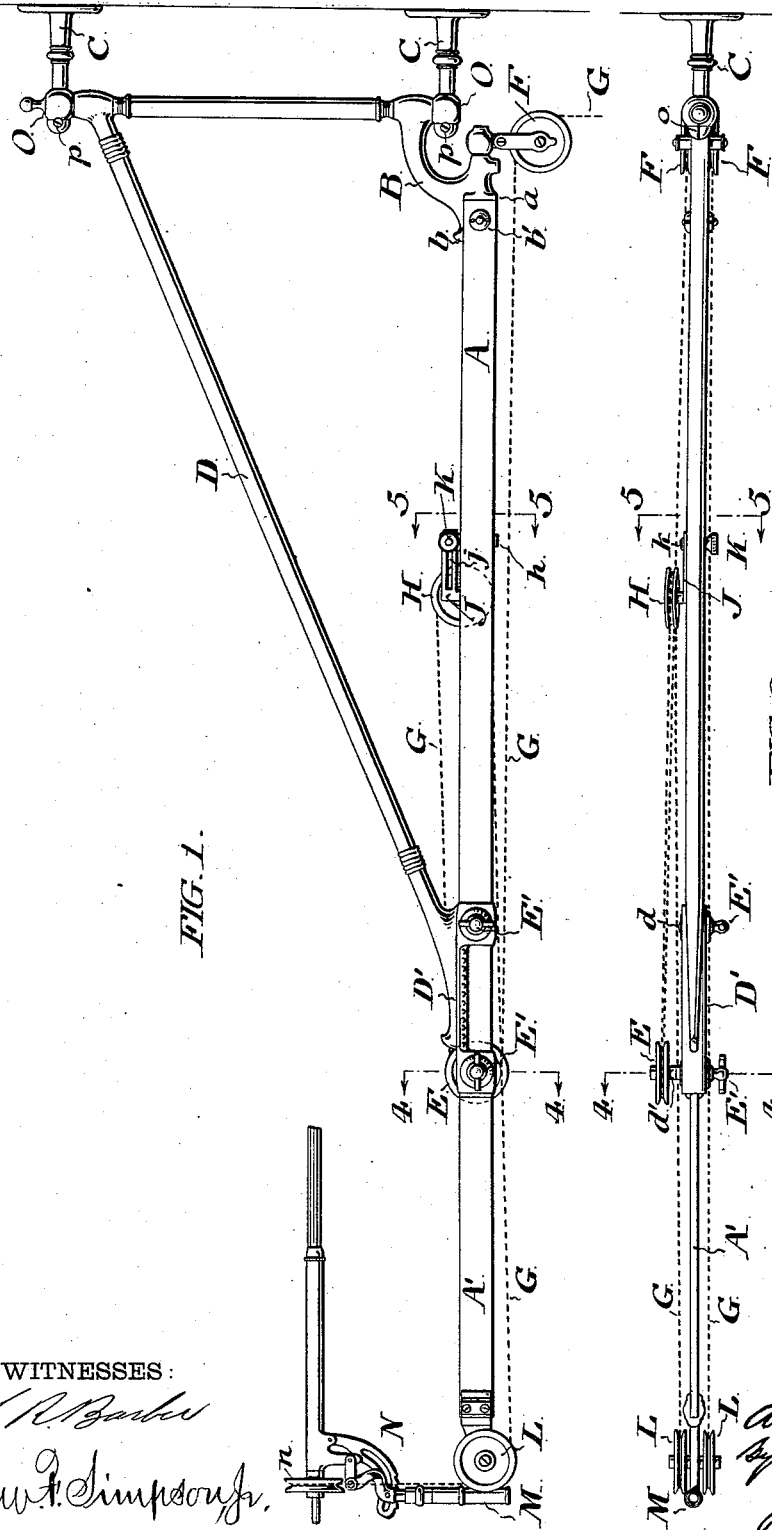

UNITED STATES PATENT OFFICE.

ARTHUR W. BROWNE, OF PRINCE'S BAY, NEW YORK, ASSIGNOR TO THE S. S. WHITE DENTAL MANUFACTURING COMPANY, OF PHILADELPHIA, PENNSYLVANIA.

ADJUSTABLE BRACKET FOR DENTAL ENGINES.

SPECIFICATION forming part of Letters Patent No. 522,552, dated July 3, 1894.

Application filed December 26, 1893. Serial No. 494,802. (No model.)

*To all whom it may concern:*

Be it known that I, ARTHUR W. BROWNE, a citizen of the United States, residing at Prince's Bay, in the county of Richmond and State of New York, have invented certain new and useful Improvements in Adjustable Brackets for Dental Engines; and I do hereby declare the following to be a full, clear, and exact description of the invention, such as will enable others skilled in the art to which it appertains to make and use the same.

My invention relates to certain improvements, as hereinafter claimed, in dental engine brackets of the class adapted to be attached to walls, window frames, &c., and capable of swinging horizontally and of being lengthened or shortened.

In the accompanying drawings, Figure 1 is a side elevation. Fig. 2 is a plan view, with the pulley head and flexible shaft omitted. Fig. 3 is a view on an enlarged scale, partly in plan and partly in longitudinal section on a line slightly above the bracket arm, parts being broken away. Fig. 4 is a transverse section on the lines 4 of Figs. 1, 2 and 3, and Fig. 5 a transverse section on the lines 5 of said figures.

The inner or main member of a sectional bracket arm is mounted to swing horizontally and constructed as follows:—Two parallel bars A A are provided at their inner ends with a carrier B by which they are jointed so as to swing horizontally about supporting lugs C C suitably connected to a wall, &c. At its lower end the swinging carrier is provided with a projection $b$ which enters between the bars A A of the bracket arm and is connected with them so as to hold them apart to form a guide way between them for the outer member A' of the sectional bracket arm to slide in. A screw bolt and its nuts $b'$ $b'$ serve to firmly connect the bracket arm bars with the carrier projection $b$ against flanges $a$ $a$ of which the bars abut. An inclined brace rod D projecting from the upper end of the hinged carrier terminates at its outer end in a sleeve or supporting socket D' which snugly embraces the bars of the main member of the bracket arm at their outer ends. The sleeve is partly cut away between its ends, and the screws $d$ $d'$ connect one of these bars with its supporting sleeve of the brace rod. The screw $d'$ is extended to constitute a journal for a belt guide pulley E. At the side of the sleeve opposite that provided with the screws $d$ $d'$, set screws E' E' pass through the supporting sleeve and may be adjusted to bear as desired upon one of the bars A, and serve to adjust this bar toward the opposite bar which is secured to the supporting sleeve D' so that the outer or sliding arm A' of the bracket may be clamped against sliding movement when adjusted as desired in its guide way between the bars A A.

A pair of guide pulleys F F for the driving belt G which has motion imparted to it in suitable way, are provided at the inner end of the bracket arm. These pulleys are connected with the bracket arm by way of its swinging carrier, and are adapted to swing horizontally and vertically as will be understood by reference to United States Letters Patent No. 503,737, dated August 22, 1893.

A belt tightening and guide pulley H is mounted at the inner end of the outer or sliding section A' of the bracket arm by means of a flanged cross-head I secured in place by screws (Fig. 5) and embracing the bracket arm bars A A at top and bottom by its flanges $h$ $h$. The cross-head is fitted between the bars of the inner section of the bracket arm so as to slide freely with the outer section of the bracket arm which it serves to brace against vertical movement or spring in its guide way in the inner section of the arm. The belt-tightening guide pulley is adapted to properly act upon the belt by being mounted in an inclined position upon its inclined journal at one end of a slotted sliding carrier J. A headed screw $k$ passes through the longitudinal slot $j$ of the sliding carrier and through a lug I' of the cross-head I, and a nut K engaging the screw serves to clamp the carrier in the desired position into which it may be moved by sliding it upon the screw when the nut is loosened. Vertical movement of the sliding carrier J is prevented by flanges above and below it on the cross head lug constituting a seat or guide way for the carrier to slide in.

At the outer end of the sliding section A' of the bracket arm there are provided a pair of belt guide pulleys L L and a support M about which turns the pulley head N of a flexible driving shaft of well known construction. The driving belt passes about the pulleys in manner as indicated by dotted lines in Figs. 1 and 2, being carried at one side about one of the pulleys F and the pulley E at the opposite ends of the inner section of the bracket arm, back from pulley E about pulley H at the inner end of the sliding section of the bracket arm, and then about one of the pulleys L at the outer end of this sliding arm, and to the pulley $n$ of the pulley head, to actuate the flexible shaft. From pulley $n$ the belt passes about one of the pulleys L and one of the pulleys F.

It will be seen that as no change takes place in the distance between the pulleys H and L of the sliding section of the bracket except such as produced by adjustments of the pulley H for tightening the belt, the adjustments of the sliding section of the arm do not interfere with the working of the belt. It will further be seen that by constructing the main section of the bracket arm of two bars secured at proper distance from each other to form a space between them constituting a guide way for the sliding section of the arm to work in, provision is made for attaching the pulley H to the sliding arm at its inner end, and that an economically produced and freely working extensible bracket arm is provided.

The supporting lugs C C of the hinged carrier B have their outer ends slotted, the slots $o$ $o$ extending to the bearings O O for the top and bottom pivots or journals of the carrier. By means of these split bearings of the lugs and adjustable clamping screws $p$ $p$ passing through the split ends of the lugs, the bearings may be tightened about the carrier journals sufficiently to yieldingly resist the swinging movement of the bracket arm, and thus enable the operator to use the tool connected with the flexible shaft to better advantage than were the bracket arm left to swing freely. The bearings are adjusted so as to prevent accidental or undesirable swinging of the bracket arm while permitting it to be readily swung when desired by the exertion of slight force.

I claim as my invention—

1. The combination of the swinging carrier having the projection at its lower end and provided at its upper end with the inclined brace rod terminating at its outer end in the supporting sleeve or socket, the two bars of the inner section of the bracket arm embraced at their outer ends by said supporting sleeve or socket and secured at their inner ends to said projection of the carrier, with a guideway space left between the bars, the outer section of the bracket arm sliding in the guideway between the bars, the pulley at the inner end of said outer section, the pulleys at the outer end thereof, and means acting upon one of the bars of the inner section of the bracket arm for moving it toward the opposite bar to clamp the outer section of the bracket arm in its position of adjustment, substantially as set forth.

2. The combination of the swinging carrier provided at its upper end with the inclined brace rod terminating at its outer end in the supporting sleeve or socket, the two bars of the inner section of the bracket arm embraced at their outer ends by said supporting sleeve or socket and having supporting connection at their inner ends with the lower end of said carrier, with a guideway space left between the bars, the outer section of the bracket arm sliding between the bars of the inner section of the bracket arm, means for clamping said sliding section in position between said bars, the adjustable guide pulleys at the outer end of the sliding section, the guide pulley carried at the inner end thereof, the cross-head between the bars with which the pulley at the inner end of the sliding section has supporting connection, means for clamping this adjustable pulley in position and the guide pulleys at the inner and outer ends of the inner section of the bracket arm, substantially as and for the purpose set forth.

In testimony whereof I affix my signature in presence of two witnesses.

ARTHUR W. BROWNE.

Witnesses:
 GEO. D. HECK,
 GRANT CARPENTER.